No. 649,818. Patented May 15, 1900.
C. M. DAYTON.
CHECK ROW CORN PLANTER.
(Application filed June 24, 1899.)
(No Model.) 3 Sheets—Sheet 2.
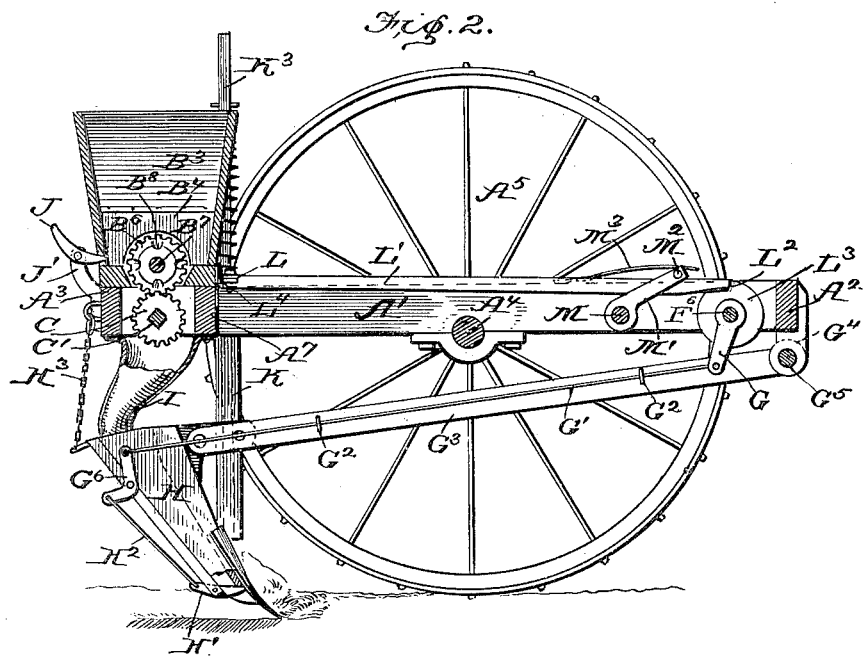
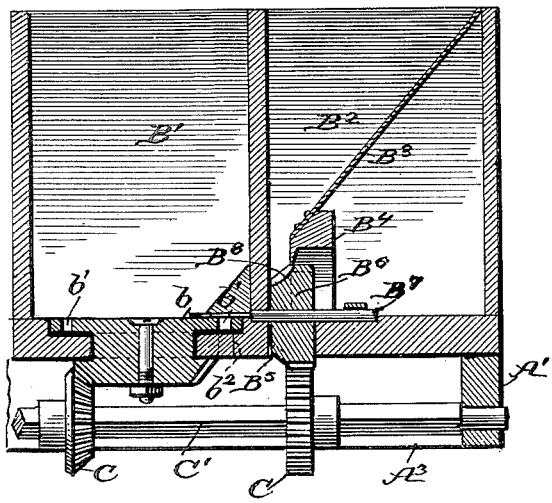
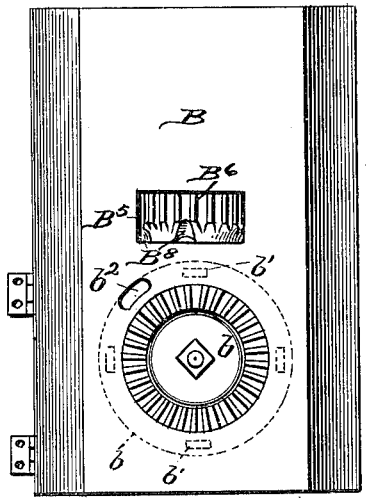
WITNESSES:
Jos. A. Ryan
F. S. Stitt
INVENTOR
Charles M. Dayton.
BY Munn & Co
ATTORNEYS.

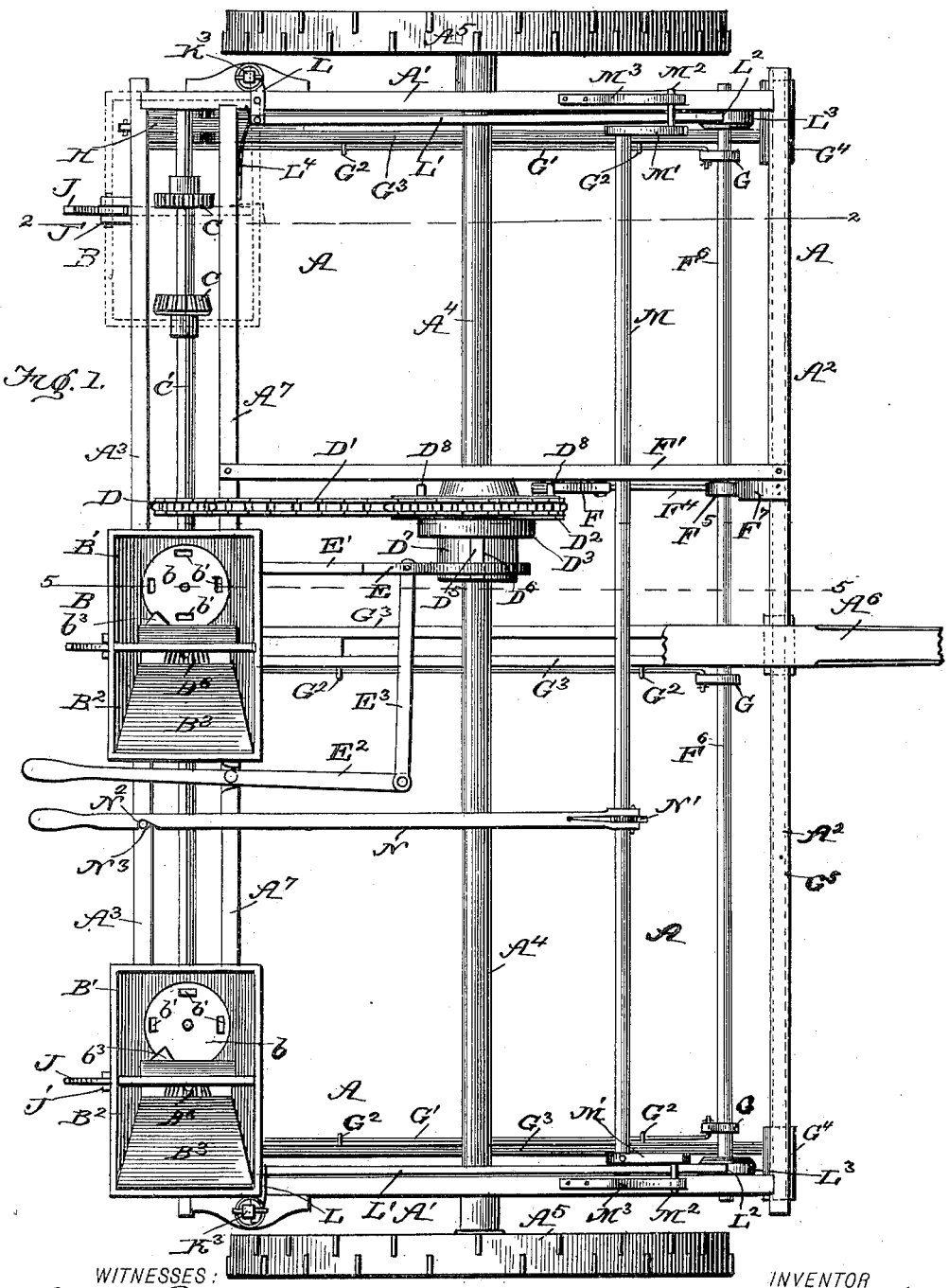

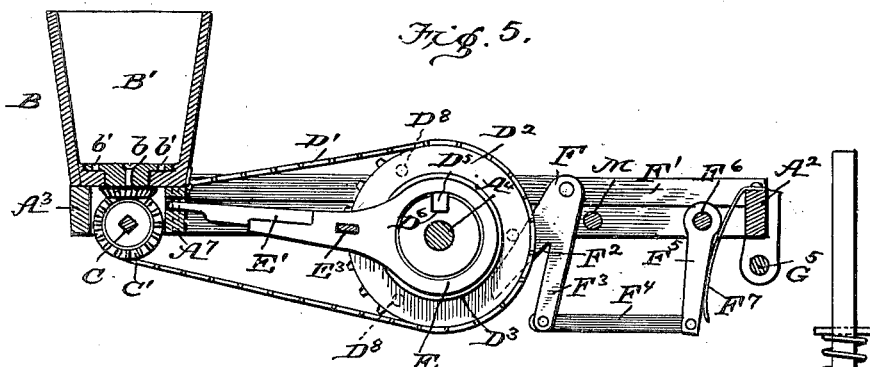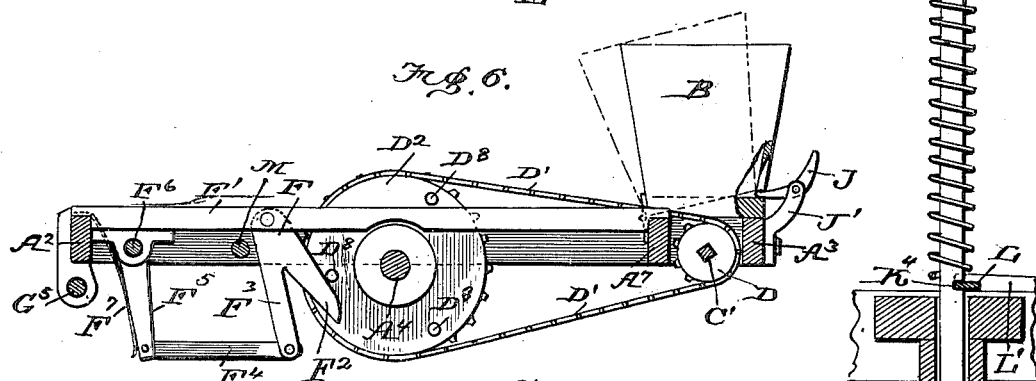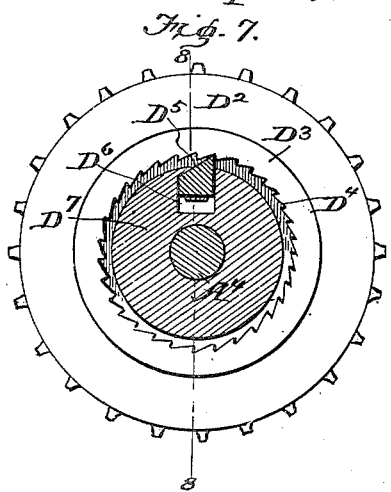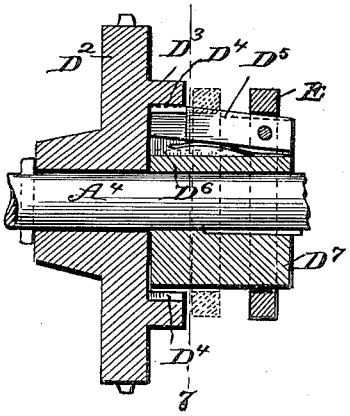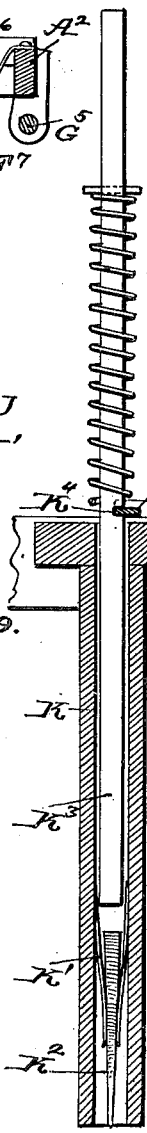

United States Patent Office.

CHARLES M. DAYTON, OF BOWLING GREEN, KENTUCKY, ASSIGNOR OF ONE-HALF TO ELVIS H. PORTER AND SAMUEL E. ELLIS, OF SAME PLACE.

CHECK-ROW CORN-PLANTER.

SPECIFICATION forming part of Letters Patent No. 649,818, dated May 15, 1900.

Application filed June 24, 1899. Serial No. 721,716. (No model.)

*To all whom it may concern:*

Be it known that I, CHARLES M. DAYTON, of Bowling Green, in the county of Warren and State of Kentucky, have invented a new and useful Improvement in Check-Row Corn-Planters, of which the following is a specification.

My invention relates to check-row corn-planters, and has for its principal object a planter of this class which will drive stakes to mark the end of the row.

A further object of the invention is to provide means for automatically actuating the stake-setting mechanism and at the same time plant in checks without the use of wire.

The invention consists, broadly, of a planter provided with stake-holders, mechanism for planting corn and fertilizer together in hills at regular intervals, and means whereby the mechanism for planting will automatically actuate the stake-holders to release and drive the stakes in order to mark the end of the row.

The invention consists in certain details of construction and combinations of parts, which I shall first describe and then point out in the appended claims.

Reference is to be had to the accompanying drawings, forming part of this specification, in which like characters of reference indicate corresponding parts in all the views.

Figure 1 is a plan view of my improved planter. Fig. 2 is a vertical section on line 2 2 of Fig. 1 with the feed-box in place. Fig. 3 is a vertical section of one of the feed-boxes. Fig. 4 is an inverted plan of the same. Fig. 5 is a section on line 5 5, Fig. 1. Fig. 6 is a similar view taken from the opposite side thereof. Fig. 7 is a detail section on the line 7 7, Fig. 8. Fig. 8 is a detail section on the line 8 8, Fig. 7; and Fig. 9 is a detail sectional elevation of one of the stake-setters.

A designates the frame of my corn-planter, which consists of the side bars $A'$ and front and rear end bars $A^2$ $A^3$, supported upon the axle $A^4$ and traveling wheels $A^5$. $A^6$ designates the draft-tongue. Extending parallel with and spaced from the end bar $A^3$ is a cross-bar $A^7$, and the feed-boxes B are mounted on the bars $A^3$ and $A^7$, as shown in the drawings.

Each box is divided by a middle partition into two compartments $B'$ and $B^2$, one being for fertilizer and the other for corn. In the bottom of the compartment $B'$, which is adapted to receive the corn, is held to rotate the feed-disk $b$, formed with seed-pockets $b'$, preferably four in number, which discharge their seed through an opening $b^2$ in the bottom of the compartment, a "cut-off" $b^3$ being located near such opening. The other compartment $B^2$, adapted to receive the fertilizer, is provided with a sloping shelf $B^3$, secured at its lower end to a bracket $B^4$, the said shelf directing the fertilizer to the inner side of the compartment $B^2$. An opening $B^5$ is formed in the bottom of the compartment and a bevel gear-wheel $B^6$ is journaled on the spindle $B^7$ in said opening and is arranged to feed the fertilizer through the opening by being formed with notches $B^8$, which serve as pockets and discharge the fertilizer as the wheel is rotated. In order to feed the corn and fertilizer from the feed-boxes B, the lower face of the feed-disks $b$ is formed with gear-teeth, and the said disks and the bevel-gear feed-wheels $B^6$ are meshed with gear-wheels C, keyed on the shaft $C'$, which is journaled in the frame between the bars $A^3$ and $A^7$.

D designates a sprocket-wheel which is keyed on the shaft $C'$ and is connected by a belt or chain $D'$ with a larger sprocket-wheel $D^2$, mounted loosely on the driving-axle $A^4$. The sprocket-wheel $D^2$ is formed on one side with an annular flange $D^3$, whose inner surface is formed with ratchet-teeth $D^4$, with which one or more spring-actuated rocking pawls $D^5$ are adapted to engage. The pawl $D^5$ is pivoted between its ends in a groove $D^6$ in the collar $D^7$, which latter is fixedly held on the driving-axle $A^4$, and in order at any time to disengage the pawl from the sprocket-wheel $D^2$, I provide the ring E, fitted to slide on the collar $D^7$ and secured to or formed integral with the arm $E'$, which is pivoted in the cross-bar $A^7$, and is pushed back and forth by the lever $E^2$ and link $E^3$. It will be seen, therefore, that when the lever $E^2$ pulls the ring E the pawl $D^5$ will be free to engage the ratchet-teeth of the sprocket-wheel $D^2$; but when pushed by the lever the ring will slide along the collar and on the forward end of the pawl, disengaging the pawl from the sprocket-wheel and causing the movement of the axle $A^4$ to be independent of and have no effect upon the shaft $C'$, so that the feed-boxes B will not discharge. It will be understood also that by the arrangement of the sprocket-wheel $D^2$, in connection with the pawl-and-ratchet mechanism, any backward movement of the planter will have no effect on the discharging devices.

In order to automatically effect the discharge of seed and fertilizer, I provide the sprocket-wheel $D^2$ with pins or studs $D^8$, preferably three in number and located equidistant from each other, and such studs are adapted to successively engage and trip a forked trigger F, pivotally depending from a bar $F'$. The studs engage with the short arms $F^2$ of the said trigger, and the other arm $F^3$ thereof is connected by a link $F^4$ with a depending finger $F^5$, secured on the shaft $F^6$, journaled in the frame. A leaf-spring $F^7$ tends to throw the trigger in the way of the studs. On the shaft $F^6$ is secured a number of arms G, there being provided one for each feed-box, and the arms G have secured thereto wires or cords $G'$, fitted in guides $G^2$ on one side of the drag-bars $G^3$, which are secured at their forward ends on collars $G^4$, pivotally mounted on a rod $G^5$, depending from the front end bar $A^2$. The wires or cords $G'$ extend back along the drag-bars and are secured at their opposite ends to one arm of the L-shaped levers $G^6$, pivotally connected to the shoes H, which latter are pivotally mounted in the drag-bars $G^3$.

The shoes H are provided with gates $H'$ at their rear, and short wires or cords $H^2$ connect these gates with the adjacent arms of the L-shaped levers $G^6$, so that the corn and fertilizer that have been discharged from the feed-boxes B and conveyed by chutes I to the shoes may be dropped out of the latter whenever the wires $G'$ are pulled by the movement of the shaft $F^6$. The drag-bars are held at their proper elevation by chains $H^3$, connected to the rear end bar $A^3$.

The ratchet-wheel $D^2$ and the other parts of the mechanism for discharging the corn and fertilizer from the feed-boxes are so related to the trigger F and its concomitant parts that the intervals of dropping the corn and fertilizer from the shoes are exactly equal to the intervals of discharge from the boxes.

I have shown in the drawings a planter provided with three feed-boxes and three dropping-shoes; but I wish it understood that I do not limit myself to this number, as it is obvious that I might use planters with any reasonable number of feed-boxes and shoes. If, however, the planter embodying the features of my invention is provided with two or more feed-boxes and dropping-shoes, I provide means for throwing any one of the feed mechanisms out of gear, so that the apparatus will plant a different number of rows, if desired. These means consist of levers J, pivoted between the ears of curved standards $J'$, secured to the rear end bar $A^3$, directly behind each feed-box. The levers J are adapted to engage openings in the rear side of the boxes B when it is desired that they be in gear; but when it is desired that a box shall be taken out of gear its rear end, which rests freely upon the end bar $A^3$, is thrown up, (the boxes being hinged, as shown, to the bar $A^7$,) and the end of the lever J is pushed under the bottom of the box and holds it elevated, as shown, by one of the boxes in Fig. 6.

On each side of the frame, near the rear thereof, is secured a guideway K, extending down to a point near the ground, and spring-clamps $K'$ are secured in said guideways near the lower ends thereof, being adapted to engage between them stakes $K^2$. Spring-impelled plunger-rods $K^3$ are fitted to move in the guideways, whereby at the proper time to thrust the stakes out of the spring-clamps and drive them into the ground. The plunger-rods are formed with recesses $K^4$, which register with and are engaged by the forward ends of detent-arms L, pivoted on the side bars of the frame, whereby to hold the plunger-rods $K^3$ retracted. The rear ends of the detents L are pivotally connected to pusher-rods $L'$, extending forward alongside the side bars of the frame and adapted to rest with their forward ends in notches $L^2$, formed in the periphery of disks $L^3$, fixedly held on the shaft $F^6$, near the ends of the same. The said pusher-rods are thrown forward by leaf-springs $L^4$, secured on the bar $A^7$ of the frame, so as to normally keep the detents in the recesses of the plunger-rods and to hold the pusher-rods fully forward.

In order to keep the forward ends of the pusher-rods $L'$ normally out of the notches $L^2$, so that the tripping of the trigger F and the consequent movement of the shaft $F^6$ and disks $L^3$ will not affect the pusher-rods $L'$ and the retracted plunger-rods $K^3$, I provide a shaft M, journaled in the frame in the rear of the shaft $F^6$ and parallel with the latter, and forwardly-extending arms $M'$ are secured on the shaft M and are provided with pins $M^2$, located one on each side of the pusher-rods $L'$, so that when the arms $M'$ are raised by turning the shaft the forward ends of the pusher-rods will be raised out of the notches, and when the arms $M'$ are lowered by the springs $M^3$ the pusher-rods are brought into engagement with the disks $L^3$. The shaft M is turned to raise the arms $M'$ by a lever N, connected to a link $N'$ on the shaft.

Now in practical operation the lever N is drawn back and the pin $N^2$ on the rear end bar $A^3$ caused to engage the recess $N^3$ on the lever. This, it is understood, raises the pusher-rods from the notched disks $L^2$. When the planter has reached the end of the row, the lever N is released, and the next engagement of one of the studs on the sprocket-wheel $D^2$ will trip the trigger F to open the dropping-shoes, and at the same time the notched disks $L^2$ will cause the plunger-rods $K^3$ to be released, and the latter will drive the stakes K² into the ground to mark the end of the row. The planter is then turned around and set in line with the stakes, the first hill is dropped, the stakes are then taken up and inserted in the spring-clamps, and the planter is driven ahead until the other end of a row is reached, when the operation described above is repeated.

It will be seen that I have provided a planter which is practically automatic in its workings and which has stake-setting mechanism and feeding mechanism for corn and fertilizer, all operated from a ratchet-wheel on the driving-axle of the planter.

Having thus described my invention, what I claim as new, and desire to secure by Letters Patent, is—

1. In a planter, a frame having a guideway arranged to hold a stake, a spring-impelled plunger in said guideway, a detent for holding the plunger retracted, a pusher-rod connected with said detent, feeding devices mounted on said frame, and a connection between said feeding devices and said pusher-rod whereby the operation of the former will actuate the latter, as set forth.

2. In a planter, a frame having a guideway thereon arranged to hold a stake, a spring-impelled plunger in said guideway, a detent for holding the plunger retracted, a pusher-rod connected with said detent, a rocking shaft in said frame having a notched disk adapted to engage and push said pusher-rod, feeding devices on said frame, and a connection between the feeding devices and the shaft whereby the operation of the former will rock the shaft, as set forth.

3. In a planter, a frame having a stake-holding device thereon, a spring-impelled plunger arranged to drive the stake, a detent for holding the plunger retracted, a pusher-rod connected with said detent, a rocking shaft in said frame and having a notched disk arranged to engage said pusher-rod, and means for automatically rocking said shaft, as set forth.

4. In a planter, a frame having a guideway thereon arranged to hold a stake, a spring-impelled plunger in said guideway, a detent for holding the plunger retracted, a pusher-rod connected to said detent, a rocking shaft in said frame arranged to push said pusher-rod, feeding devices on the frame, and a trigger connected with said rocking shaft, said trigger being tripped by the feeding devices, as set forth.

5. In a planter, the frame having a guideway arranged to hold a stake, a spring-impelled plunger-rod in said guideway, a detent for holding said rod retracted, a spring-pressed pusher-rod connected to said detent, feeding devices mounted on said frames, a connection between said feeding devices and said pusher-rod whereby the operation of the former will actuate the latter, and means for holding said pusher-rod out of engagement with the feeding devices, as set forth.

6. In a planter, the frame provided with a guideway arranged to detachably hold a stake, a spring-impelled plunger-rod in said guideway and adapted to drive the stake in the ground, a detent for holding said rod retracted, a pusher-rod connected to said detent, a shaft mounted in the frame, a notched disk on said shaft and arranged to engage the pusher-rod to withdraw the detent, feeding devices arranged to automatically turn said shaft, and means for holding the pusher-rods disengaged from the notched disk, as set forth.

7. In a planter, a wheel-supported frame, a driving-axle, a feed-box on said frame, a shaft operatively connected with said feed-box to control the discharge therefrom, a sprocket-wheel fixed on said shaft, a sprocket-wheel loosely fitted on the driving-axle and connected with the other sprocket-wheel, the loose sprocket-wheel being formed with an interiorly-ratchet-toothed annular flange, a collar fixedly held on the driving-axle and having a pawl spring-pressed into engagement with said flange, an arm pivotally mounted in the frame and formed with a ring fitted to slide on said collar, and a lever fulcrumed on the frame and having a link connection with said arm whereby to slide the ring back and forth over the pawl, as described.

8. In a planter, a frame, a driving-axle, a feed-box on said frame, a shaft operatively connected with said feed-box to control the discharge therefrom, a wheel fixed on said shaft, a wheel loosely fitted on the driving-axle and connected with the first-named wheel, the said loose wheel being formed with an interiorly-toothed annular flange, a collar fixedly held on the driving-axle and having a pawl spring-pressed into engagement with said flange, a ring on said collar, said ring being adapted to slide over said pawl to disengage it from said flange, and means for sliding said ring, as set forth.

9. In a planter, the frame, the driving-axle, the feed-box on said frame, the shaft operatively connected with said feed-box to control the discharge therefrom, the sprocket-wheel fixed on said shaft, the sprocket-wheel loosely fitted on the driving-axle and connected to the first-named sprocket-wheel, the said loose sprocket-wheel being formed with an annular flange having ratchet-teeth on its inner surface, a collar fixed on the driving-axle and having a pawl adapted to engage with such teeth, and means for holding said pawl out of engagement with such teeth, as and for the purpose set forth.

10. In a planter, a frame having a guideway thereon, arranged to hold a stake, a spring-impelled plunger in said guideway, a detent for holding said plunger retracted, a pusher-rod connected with said detent, a rocking shaft in said frame, having a notched disk on which the free end of said rod is adapted to rest, a trigger connected with said shaft, and feeding devices on said frame, said devices including a sprocket-wheel having pins thereon adapted to trip said trigger to rock the shaft, as set forth.

11. In a planter, a frame having a stake-holding device thereon, a spring-impelled plunger adapted to drive the stake, a detent for holding the plunger retracted, a pusher-rod connected with said detent, a rocking shaft in said frame having a notched disk on which said pusher-rod is arranged to rest, a trigger connected with said shaft, means for automatically rocking said shaft, and means for holding said pusher-rod raised out of the way of the notched disk, as set forth.

12. In a planter, the combination with the frame, of a stake-holding device thereon, a spring-impelled plunger arranged to drive the stake, a detent for holding the plunger retracted, a pusher-rod connected to said detent, a rocking shaft in said frame, said shaft being arranged to push said pusher-rod, a dropping-shoe supported from the frame and having a pivoted gate, a connection between said gate and said rocking shaft, and means for rocking said shaft, as set forth.

13. In a planter, the combination with a frame having a feed-box and a dropping-shoe, of a stake-holding device on said frame, a spring-impelled plunger adapted to drive the stake, a detent for holding said plunger retracted, a rocking shaft in said frame, mechanism for automatically discharging from said feed-box, an intermittent connection between said discharging mechanism and said rocking shaft, a connection between said shaft and the dropping-shoe whereby to open the latter simultaneously with the discharge from the feed-box, and a pusher-rod connected with said detent and arranged for connection with the rocking shaft, as set forth.

14. In a planter, a frame having a guideway thereon arranged to hold a stake, a spring-impelled plunger in said guideway, a detent for holding said plunger retracted, a pusher-rod having one end connected to said detent, the opposite end of said rod being free, a rocking shaft in said frame having a notched disk in which the free end of said rod is adapted to rest, means for automatically rocking said shaft, and a second shaft in said frame having a pin in engagement with the free end of said rod whereby to hold the said end out of the way of the disk, as set forth.

CHARLES M. DAYTON.

Witnesses:
  H. A. McKay,
  D. B. Moore.